(No Model.) 2 Sheets—Sheet 1.
G. F. PAGE.
MACHINE BELTING.
No. 400,006. Patented Mar. 19, 1889.
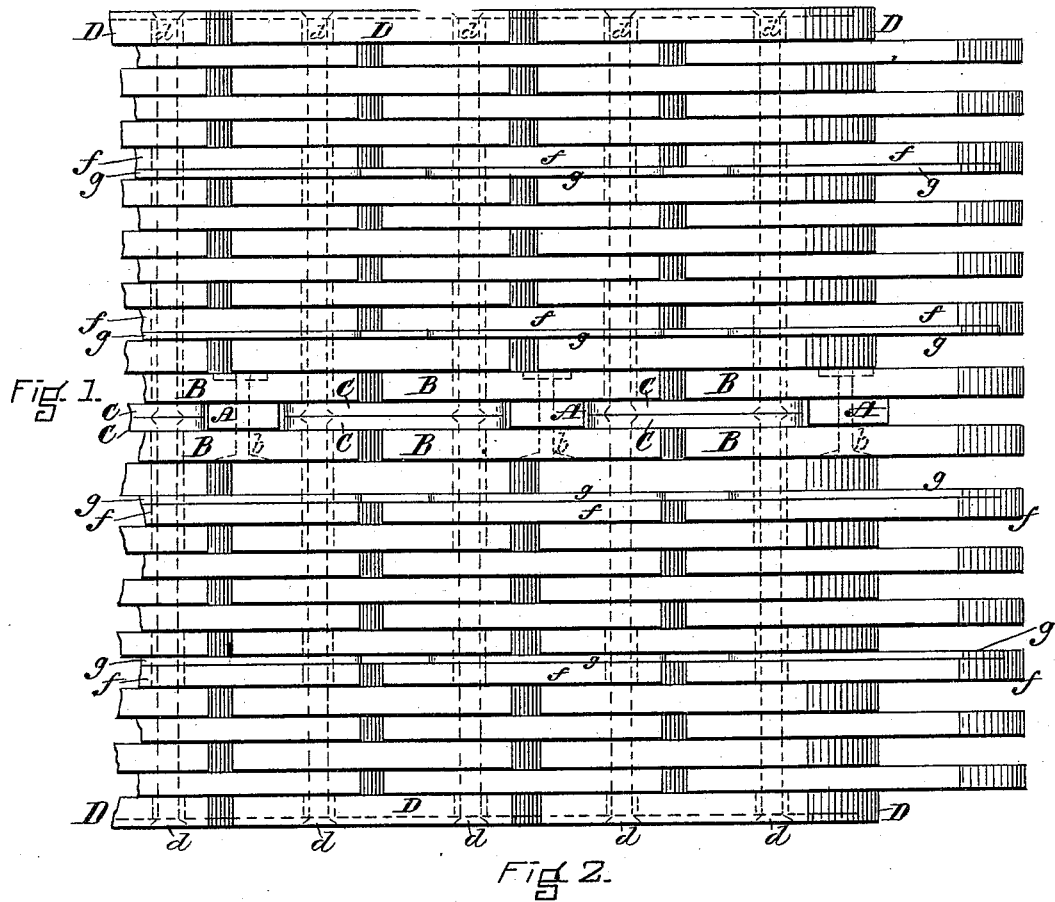
Fig. 1.
Fig. 2.
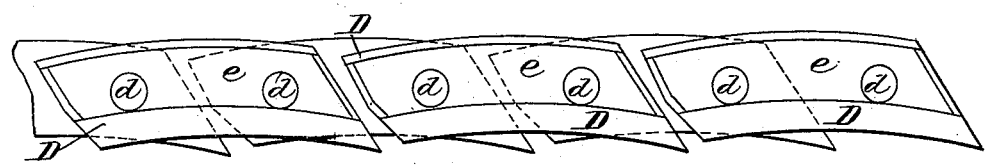
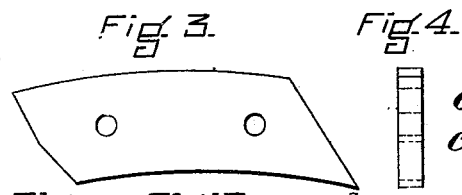
Fig. 3. Fig. 4.
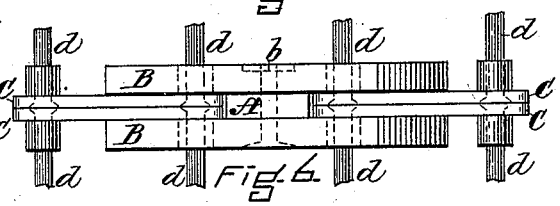
Fig. 5.
Fig. 9. Fig. 10.
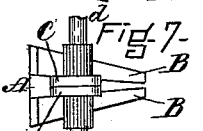
Fig. 7.
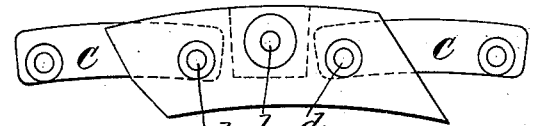
Fig. 6.
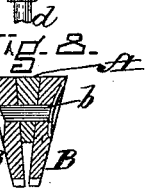
Fig. 8.
WITNESSES.
A. D. Grover
H. F. Aiken
INVENTOR.
George F. Page
By R. Teychemacher
Atty (No Model.) 2 Sheets—Sheet 2.
G. F. PAGE.
MACHINE BELTING.
No. 400,006. Patented Mar. 19, 1889.
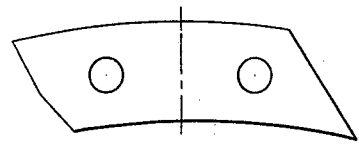  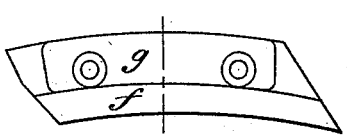 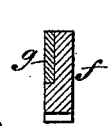
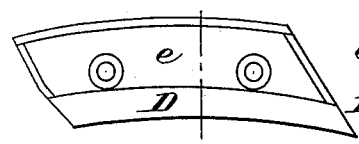   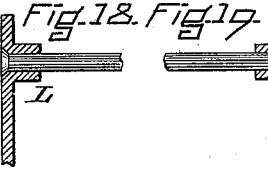 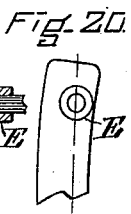
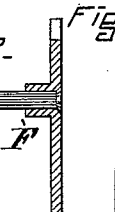  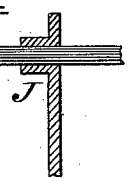 
 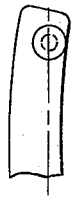 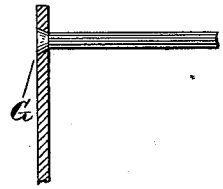
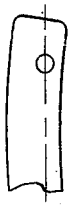 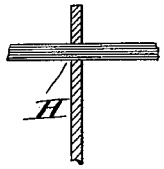 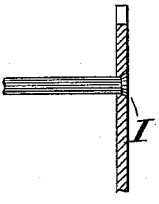 
WITNESSES.
A. D. Grover
H. S. Aiken
INVENTOR
George F. Page
By R. E. Teschemacher
Atty

UNITED STATES PATENT OFFICE.

GEORGE F. PAGE, OF CONCORD, NEW HAMPSHIRE.

MACHINE-BELTING.

SPECIFICATION forming part of Letters Patent No. 400,006, dated March 19, 1889.

Application filed December 7, 1888. Serial No. 292,869. (No model.)

*To all whom it may concern:*

Be it known that I, GEORGE F. PAGE, a citizen of the United States, residing at Concord, in the county of Merrimac and State of New Hampshire, have invented certain new and useful Improvements in Machine-Belting Composed of Links of Leather or other Suitable Flexible Substance, of which the following is a full, clear, and exact description, reference being had to the accompanying drawings, making part of this specification, in which—

Figure 1 is a top or plan view of a piece of leather-link belting embodying my improvements. Fig. 2 is a longitudinal elevation of the same; Figs. 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32, details and modifications to be referred to.

My invention relates to certain improvements in the manufacture of belting composed of links of leather or other suitable material connected by transverse bolts; and my invention consists in the peculiar construction, combination, and arrangement of the several parts, as will be hereinafter set forth, and specifically pointed out in the claims.

Similar letters of reference indicate corresponding parts in each of the several figures.

In constructing my improved belting I employ for the most part pieces of leather or other material suitable for the purpose; but I preferably use leather either tanned with bark or some other suitable tanning material, or what is known as "mechanically-made rawhide," which is tanned a little upon the surface and has its inner portion treated by a mechanical process which preserves it and renders it soft and pliable. These pieces or links of leather may be made in the form ordinarily used as heretofore in making link belts; but I prefer to make them in a rhomboidal shape, as shown in Fig. 3, which is the same as described in my application for Letters Patent of the United States, filed November 14, 1887, and allowed May 25, 1888, for by the use of such rhomboidal links I obtain complete contact between the belt and the pulley longitudinally as the belt passes around it. I also prefer to insert one or more rows of links of V shape in cross-section, as shown in Figs. 11 and 12, and also in my application for Letters Patent above referred to, for by this means I also obtain complete contact between the belt and the pulley laterally.

In making this belt I find it best to first construct what I term a "hinge-link," as shown in Figs. 5, 6, 7, 8, 9, and 10, which consists of two of the ordinary links, B B, fastened together near the center by means of a suitable bolt or rivet, *b*. In practice I find it advisable, though not necessary, to insert between these two links B B a small piece of leather, A, which is preferably made wedge-shaped, as shown in Figs. 8 and 10. These two links B B, which I use to form the hinge-joint, I prefer to make V-shaped in cross-section, as shown. By means of this and the construction hereinafter described I obtain a flexible joint along the center of the belt, so that without curvature or spring of the bolts the belt will adjust itself to the crowning shape of the pulley. To prevent the wear of the heads of the bolts in these links, and also to assist in making more complete the hinge or flexible joint, I insert between the links B B and against the side of each a double washer, C, composed of metal, rawhide, celluloid, celluvert, zylonite, or other suitable material. This double washer C receives the heads of two transverse bolts, *d*, the holes in the washers being properly countersunk for that purpose. After all the links, as hereinafter described, are placed upon the bolts, with the exception of the outer row of links, I put a link, D, of peculiar construction, last of all upon the ends of the said bolts. This link D is shown in Figs. 1, 2, 15, and 16, and is provided with double washers *e*, composed of metal, rawhide, or other suitable material, which may or may not be sunk, in whole or in part, into the leather. I prefer, however, to have them sunk substantially their thickness into the leather link. The object of this double washer *e* is partly the same as that of the double washer C at the flexible hinge-joint above described, as it serves to protect the leather in the heading over or riveting of the bolts, or where a thread is formed upon the bolt and a nut screwed upon it. This double washer *e* also serves another important purpose—viz., it furnishes a metal surface upon the outer edge of the belt, so that when a fork is used in shipping the belt from one pulley to another the leather will be protected from wear or abrasion.

I am aware that metal links have been used upon the outer edges of link belts; but where these metal links have been used, whether they are made the full size of the leather link or not, they increase the width of the belt by their own thickness without adding anything to its ability to transmit power. By my peculiar construction the width of the belt is not increased by the addition of these double washers and no metal surface comes in contact with the pulley. These washers e, composed of metal or other suitable material and placed at both ends of the transverse bolts d, serve the purpose already stated, and are put into the belt for the reasons given; but it is found in practice that such washers have less tendency to stretch than the leather, which forms the main part of the belt, and in order that the tensile strength may be substantially or quite equal throughout its entire width I insert upon the bolts d in the main body of the belt, and between the washers e and C, what I term "equalizing-links" f. These links f are composed of leather, rawhide, or other suitable material, the same as the body of the belt, and have inserted upon one side by rabbeting a piece, g, of metal, rawhide, or other suitable material, of the form shown in Figs. 13 and 14, which is substantially similar to the washers e and C at the ends of the bolts d.

I am aware that link belts have been made in which metal has been used for some of the links, and also that belts have been made in which a piece of metal has been inserted in the center of the link; but, in the first instance, if the metal link was not of the same size as the leather link, it produced a space between two adjacent leather links, which destroyed so much of what would otherwise be a traction-surface of the belt, thus lessening its ability to transmit power; and in the second instance, where the metal was placed in the interior of the link, it was done for a specific purpose altogether different from mine, and by a construction differing entirely from that embodied in my invention. The pieces g of metal, rawhide, or other suitable material, (shown in Figs. 13 and 14,) being rabbeted in the side of the link, do not affect or reduce the complete contact between the material of the belt and the pulley.

In constructing these equalizing-links f, I do not make them as wide as the other links of the belt, but narrower, as shown in Figs. 13 and 14, so that while the inner side or edge of the link comes in contact with the pulley, on the reverse or outer side it does not extend up to the level of the edges of the adjacent leather links. This narrower link, f, being thus inserted, gives a little more flexibility to the belt than if all the links were of the same width, and these narrower links may be made V-shaped, as already intimated. I prefer to make the belt in this manner, although my invention will not be impaired if I make the links all of full width and rabbet these metal or rawhide pieces into the leather or other material forming the equalizing-links, leaving the leather to project in thickness upon either side of the metal or rawhide strips.

In practice I find that if strips of metal are used to form the double washers or the equalizing-links there is a tendency for these pieces of metal to wear upon the bolts and the bolts themselves to become rapidly worn, and to obviate these objections I prefer to make these metal strips as shown in Figs. 18, 19, 20, 21, 22, and 24 at L, E, and F—that is, with projecting pieces or bosses where the bolts pass through—thus affording a large surface to come into contact with the rods and resulting in less liability of cutting or rapid wear caused by friction of metal against metal. These pieces may be placed entirely upon one side of the metal strips, as seen in Fig. 24 at J, or may project upon both sides, as shown at E, Fig. 19, or they may be left out entirely and the strips left plain, as shown at G, H, and I, Figs. 28, 30, and 31; but I prefer to have them made as shown at L, E, and F, Figs. 18, 19, and 22. Where the metal strips are made with these bosses the leather has larger holes punched through it of sufficient size to admit of its being placed over the bosses instead of merely over the bolts. In other words, the bosses project into the leather to the extent of their length.

A driving-belt constructed in accordance with my invention possesses the following advantages—viz., the complete contact between the belt and the pulley both longitudinally and laterally, the flexible or hinge joint producing almost absolutely complete contact of the belt with the pulley at the center, in fact, much more complete than with the ordinary joints used in other modes of constructing link belts; protection of the leather from the wear of the heads and ends of the bolts; the production of a belt that may be shipped by a fork without injury to the material of which the belt is principally composed, and also without increasing for this purpose the width of the belt; the production, also, of a belt in which there is very little tendency to stretch, the whole being equalized and nicely balanced throughout its construction; the production, also, of a belt with lateral flexibility between the heads and ends of the same bolts, which, together with the central flexible joint and the V-shaped links, as shown and described, enable it to adjust itself perfectly to the crowning shape of the pulley, and at the same time produce complete contact with the same in both directions.

Being aware that links of steel or other metal have been inserted in leather-link belting, I do not claim, broadly, the use of a strengthening-link composed of metal; but

I claim—

1. In a leather-link driving-belt, the combination, with a series of links connected together by transverse bolts extending from the outer edges of the belt to its center, of the herein-described flexible or hinge joint composed of links B B, secured together near the center in pairs by bolts or rivets, substantially in the manner and for the purpose set forth.

2. In a link belt, the double washers C, composed of metal or other suitable material, and placed upon the heads of the transverse bolts along the line of the hinge or flexible joint and between the links B B, secured together by the central rivet, b, substantially as described.

3. In a link belt, the combination, with the leather links and their transverse connecting-bolts d, of the double metal washers e, placed over the ends of said bolts upon the outer edges of the belt, substantially in the manner and for the purpose set forth.

4. In a link belt, the combination, with the leather links and their transverse connecting-bolts, of the equalizing-links f, composed of leather or other suitable material, having inserted upon one side a piece, g, of metal or other suitable material, said equalizing-links being placed upon the bolts d in the main body of the belt, substantially in the manner and for the purpose set forth.

5. A driving-belt composed of links of leather or other suitable material of substantially rhomboidal shape, connected together by transverse bolts, in combination with a hinge or flexible joint, substantially as described, the double washers C, arranged along the line of the hinge-joint, the double washers e, placed over the ends of the bolts at the outer edges of the belt, and the equalizing-links f, inserted within the body of the belt, all constructed and operating substantially in the manner and for the purpose set forth.

6. In a link belt, the combination, with the usual links of leather or other suitable material connected together by transverse bolts, of links narrower than the thickness of the belt and V shape in form, inserted longitudinally between the outer edges of the belt, substantially as described.

7. In a link belt, the combination, with the usual links of leather or other suitable material, connected together by transverse bolts, of equalizing-links narrower than the thickness of the belt inserted longitudinally between the outside edges of the belt, substantially as described.

Witness my hand this 27th day of September, A. D. 1888.

GEORGE F. PAGE.

In presence of—
  P. E. TESCHEMACHER,
  A. D. GROVER.